United States Patent
Lin

(10) Patent No.: US 8,717,154 B2
(45) Date of Patent: May 6, 2014

(54) COMPUTING DEVICE AND METHOD OF AUTOMOBILE CONTROL

(75) Inventor: Yu-Chieh Lin, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 155 days.

(21) Appl. No.: 13/323,835

(22) Filed: Dec. 13, 2011

(65) Prior Publication Data
US 2012/0256740 A1    Oct. 11, 2012

(30) Foreign Application Priority Data
Apr. 11, 2011    (TC) .............................. 100112379 U

(51) Int. Cl.
*B60R 25/10*    (2013.01)
*G05B 19/00*    (2006.01)

(52) U.S. Cl.
USPC ................ 340/426.1; 340/426.36; 340/572.1; 340/5.61; 455/556.1; 307/10.2

(58) Field of Classification Search
USPC ............. 340/426.1, 426.37, 5.71, 5.61, 10.2, 340/426.36, 572.1, 426.3, 426.28, 426.29; 455/556.1, 556.2; 307/10.1, 10.2, 10.8; 180/281
See application file for complete search history.

(56) References Cited

U.S. PATENT DOCUMENTS

| | | | | |
|---|---|---|---|---|
| 6,429,768 | B1 * | 8/2002 | Flick | 340/5.2 |
| 6,831,547 | B2 * | 12/2004 | Kurita et al. | 340/5.61 |
| 6,937,137 | B1 * | 8/2005 | Giehler et al. | 340/5.61 |
| 7,378,945 | B2 * | 5/2008 | Flick | 340/426.1 |
| 2007/0290792 | A1 * | 12/2007 | Tsuchimochi et al. | 340/5.61 |

* cited by examiner

*Primary Examiner* — Anh V La
(74) *Attorney, Agent, or Firm* — Novak Druce Connolly Bove + Quigg LLP

(57) ABSTRACT

A computing device and an automobile controlling method stores identification information in an electronic tag of authorized communication devices and a memory of the computing device. The identification information of an electronic tag of a communication device is obtained and a door of an automobile is unlocked if the obtained identification information matches identification information stored in the memory.

12 Claims, 4 Drawing Sheets

COMPUTING DEVICE AND METHOD OF AUTOMOBILE CONTROL

BACKGROUND

1. Technical Field

Embodiments of the present disclosure relate to automobile controlling technology, and more particularly to a computing device and an automobile controlling method using the computing device.

2. Description of Related Art

Mobile phones, are widely used because of their multifunctional services and other conveniences. A mobile phone has many uses apart from keeping people in contact, it can also function as a dictionary, a media player, and a radio. In addition, the mobile phone can provide navigation for an automobile. However, presently, the mobile phone cannot be used to control the automobile.

DETAILED DESCRIPTION

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
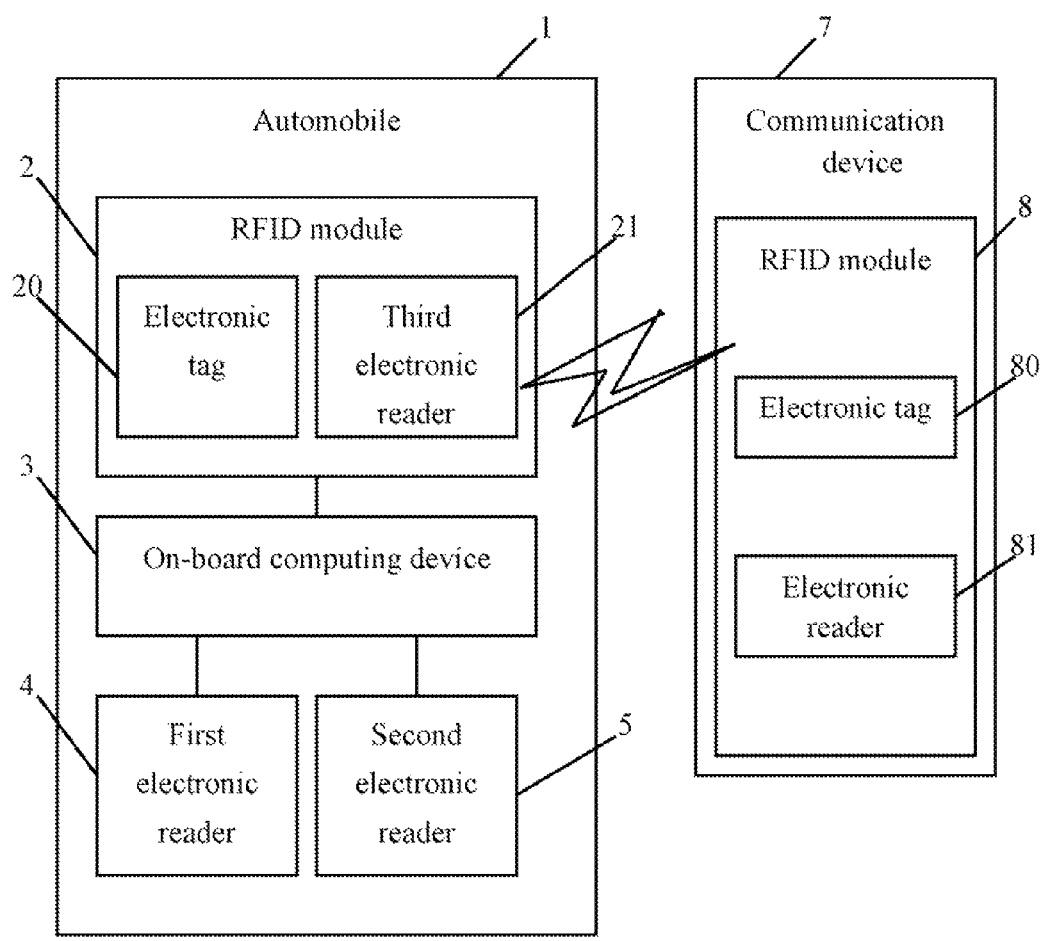
FIG. 1 is a block diagram of one embodiment of an automobile with an on-board computing device.

FIG. 1 is a block diagram of one embodiment of an automobile 1. The automobile 1 can communicate wirelessly with one or more communication devices 7 (only one shown). The communication devices 7 may include authorized and unauthorized communication devices. The communication device 7 may be a mobile phone, which includes a radio frequency identification (RFID) module 8. The RFID module 8 may include an electronic tag 80 and an electronic reader 81. It should be understood that, RFID is technology that uses radio waves to transfer data from an electronic tag, also called an RFID tag (such as the electronic tag 80) within an object, to a reader (such as the electronic reader 81) for the purpose of identifying and tracking the object.

In one embodiment, the automobile 1 includes a RFID module 2, an on-board computing device 3, a first electronic reader 4, and a second electronic reader 5. The RFID module 2 includes an electronic tag 20 and a third electronic reader 21. The first electronic reader 4 may be placed in a door (not shown) of the automobile 1, and the second electronic reader 5 may be placed in a trunk (not shown) of the automobile 1.

Figure 2:
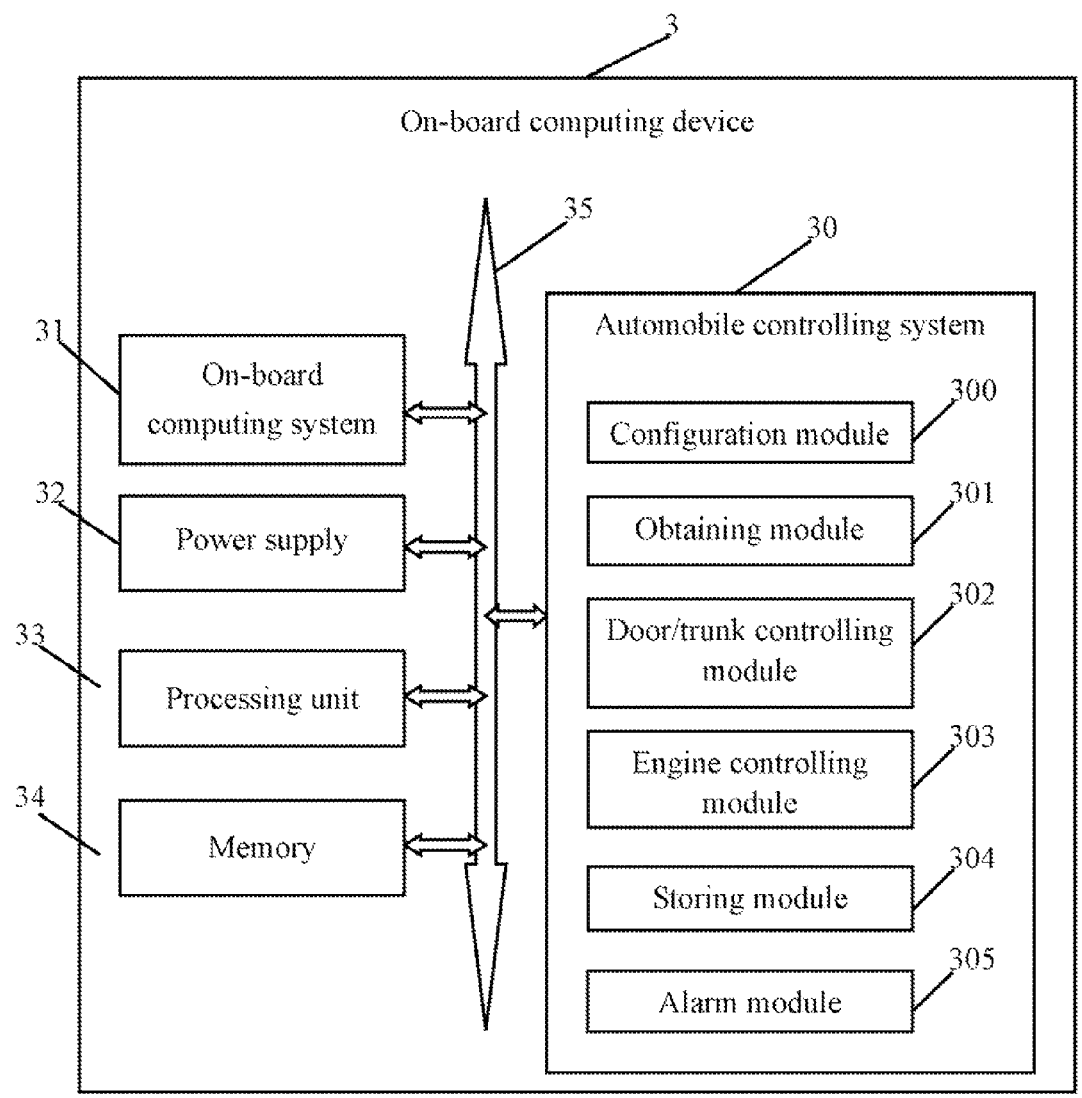
FIG. 2 is a block diagram of one embodiment of components and function modules of the on-board computing device of FIG. 1.

FIG. 2 is a block diagram of one embodiment of components and function modules of the on-board computing device 3. The on-board computing device 3 may include an automobile controlling system 30, an on-board computing system 31, a power supply 32, a processing unit 33, a memory 34, and bus 35. One skilled in the art would recognize that the on-board computing device 3 may be configured in a number of other ways and may include other or different components.

The bus 35 permits communication among the components, such as the automobile controlling system 30, the on-board computing system 31, the power supply 32, the processing unit 33, and the memory 34.

The automobile controlling system 30 may include a plurality of function modules which include computerized code in the form of one or more programs. In one embodiment, the plurality of function modules may include a configuration module 300, an obtaining module 301, and a door/trunk controlling module 302. In another embodiment, the plurality of function modules may further include an engine controlling module 303, a storing module 304, and/or an alarm module 305. The function modules 300-305 provide the functions of controlling the automobile 1, such as locking or unlocking the door and/or the trunk of the automobile 1, and starting and stopping an engine (not shown) of the automobile 1, thus, no physical key is needed. Detailed descriptions of the function modules 300-305 are given in FIG. 3.

The on-board computing system 31 also includes computerized codes in the form of one or more programs, which provide the functions of the computing in relation to the automobile 1. The computing may include data as to various conditions of the automobile 1 (condition information) including (but not limited to), tire pressure, mileage, oil quantity, and temperature reading of the automobile 1. In one embodiment, the automobile controlling system 30 and the on-board computing system 31 can be integrated.

The power supply 32 may be one or more batteries or may use power generated from the engine of the automobile 1.

The processing unit 33 may include a processor, a microprocessor, an application-specific integrated circuit (ASIC), and a field programmable gate array (FPGA), for example. The processing unit 33 may execute the computerized code of the function modules 300-305 of the automobile controlling system 30 and the on-board computing system 31, to realize the functions of the automobile controlling system 30 and the on-board computing system 31.

The memory 34 may include a random access memory (RAM) or other type of dynamic storage device, a read only memory (ROM) or other type of static storage device, a flash memory, such as an electrically erasable programmable read only memory (EEPROM) device, and/or some other type(s) of computer-readable storage medium, such as a hard disk drive, a compact disc, a digital video disc, or a tape drive. The memory 34 stores the computerized code of the function modules of the automobile controlling system 30 and the on-board computing system 31 for execution by the processing unit 33.

The memory 34 may also be used to store permanent/temporary data and other intermediate information in addition to the condition information, such as identification information of the authorized communication devices 7. The identification information may be information as to the user of each authorized communication device 7, such as a user name and/or a user identity. In another embodiment, the identification information may be information/data as the hardware device of each authorized communication device 7, such as a serial number.

Figure 3:
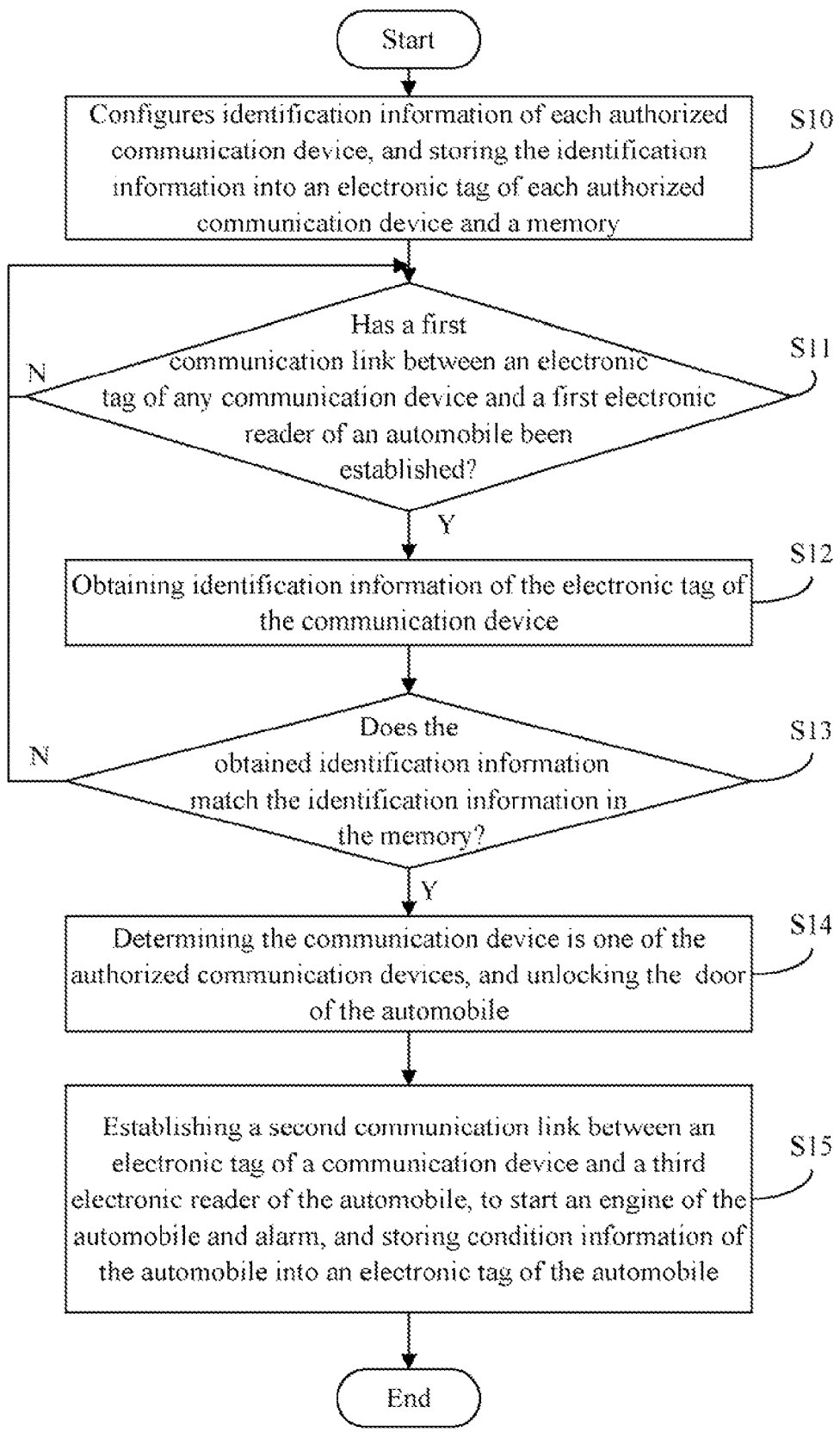
FIG. 3 is a flowchart of one embodiment of a method of automobile control.

FIG. 3 is a flowchart of one embodiment of an automobile controlling method. Depending on the embodiment, additional blocks may be added, others removed, and the ordering of the blocks may be changed.

In block S10, the configuration module 300 configures identification information in relation to each authorized communication device 7, and stores the identification information in the memory 34 and the electronic tag 80 of each authorized communication device 7. In one embodiment, the identification information is input by a user using an user interface of the on-board computing device 3, and can be updated, added to, or deleted as required.

In block S11, the first electronic reader 4 of the automobile 1 determines if a first communication link between the first electronic reader 4 and the electronic tag 80 of the communication device 7 has been established using radio waves. Block S11 is repeated until a first communication link between the first electronic reader 4 and the electronic tag 80 is established. Block S12 is implemented if the first communication link has been established.

In block S12, the first electronic reader 4 obtains the identification information from the electronic tag 80 of the communication device 7, and the obtaining module 301 obtains the identification information from the first electronic reader 4.

In block S13, the door/trunk controlling module 302 determines if the identification information obtained matches the identification information stored in the memory 34. The procedure reverts to block S11 if the identification information obtained does not match the identification information stored in the memory 34. Block S14 is implemented if the identification information obtained does match the identification information stored in the memory 34.

In block S14, the door/trunk controlling module 302 determines that the communication device 7 is authorized, and unlocks the door of the automobile 1. In one embodiment, the process described in FIG. 3 may end after block S14.

If the first communication link is established between the electronic tag 80 of the communication device 7 and the second electronic reader 5 of the automobile 1, then in block S14, the door/trunk controlling module 302 unlocks the trunk of the automobile 1.

In another embodiment, the process in FIG. 3 may further include block S15, in which, when a second communication link between the electronic tag 80 of the communication device 7 and the third electronic reader 21 of the automobile 1 has been established using radio waves, the engine controlling module 303 may start the engine of the automobile 1, or activate the alarm module 305. In addition, in block S15, the storing module 304 may obtain the condition information of the automobile 1 from the on-board computing system 31, and store the condition information in the electronic tag 20 of the RFID module 2 of the automobile 1. Details of the block S15 are as follows and as illustrated in FIG. 4.

Figure 4:
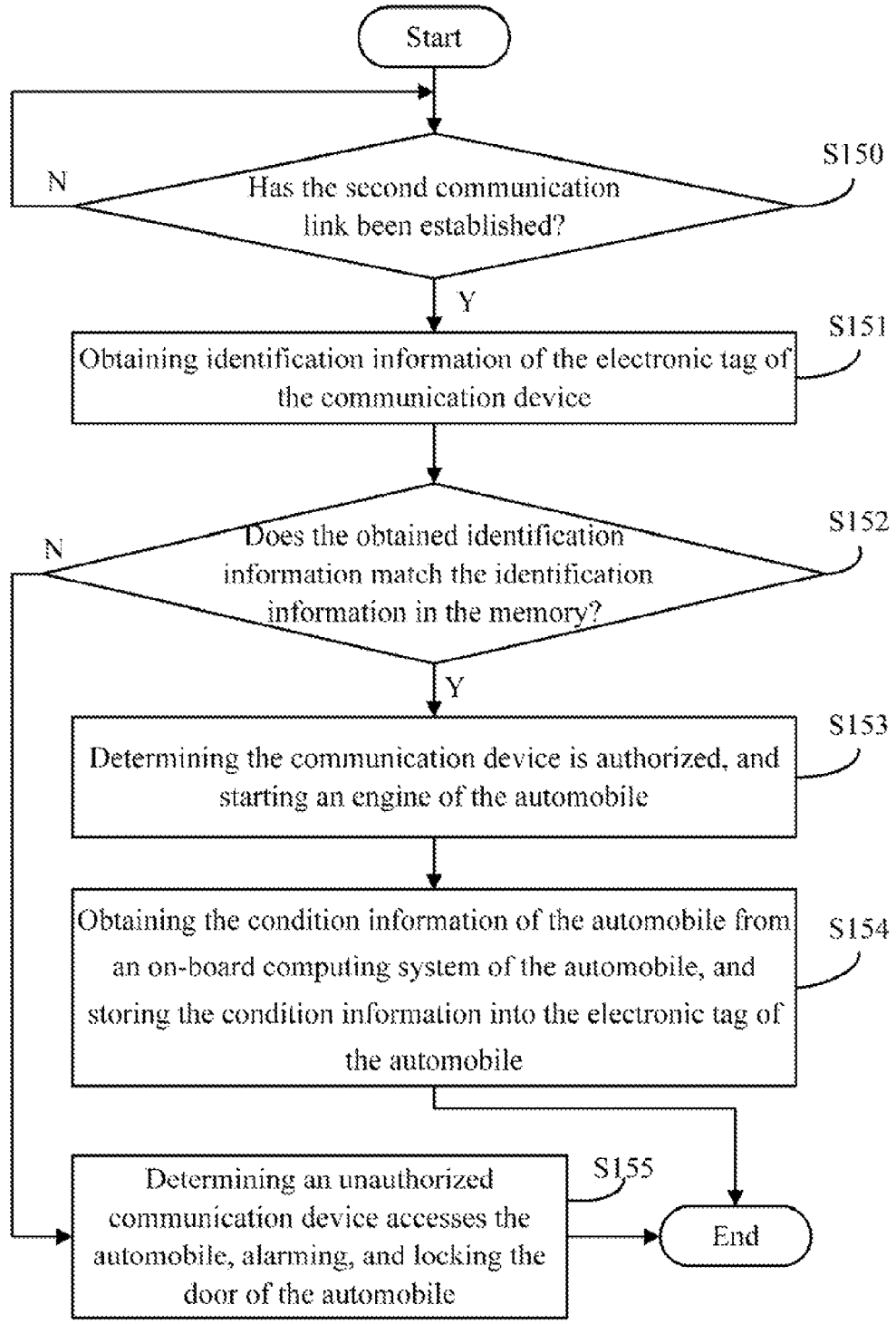
FIG. 4 is a flowchart of one embodiment of the detail of block S15 of FIG. 3.

FIG. 4 is a flowchart of one embodiment of the block S15 details as illustrated in FIG. 3. Depending on the embodiment, additional blocks may be added, others removed, and the ordering of the blocks may be changed.

In block S150, the third electronic reader 21 of the automobile 1 determines whether the second communication link between the third electronic reader 21 and the electronic tag 80 of the communication device 7 has been established using radio waves. Block S150 is repeated until the second communication link has been established. Block S151 is implemented when the second communication link has been established.

In block S151, the third electronic reader 21 of the automobile 1 obtains the identification information from the electronic tag 80 of the communication device 7, and the obtaining module 301 obtains the identification information from the third electronic reader 21 of the automobile 1.

In block S152, the engine controlling module 303 determines if the identification information obtained matches the relevant identification information stored in the memory 34. Block S155 is implemented if a match is not found. Block S153 is implemented if the identification information obtained does match the stored identification information.

In block S153, the engine controlling module 303 determines that the communication device 7 is authorized, and starts the engine of the automobile.

In block S154, the storing module 304 obtains the condition information of the automobile 1 from the on-board computing system 31, and stores the condition information in the electronic tag 20 of the RFID module 2 of the automobile 1, enabling the electronic reader 81 of the communication device 7 to obtain and display the condition information from the electronic tag 20 of the RFID module 2 of the automobile 1. Block S154 may be the end of the process in FIG. 4.

In block S155, the engine controlling module 303 determines that an unauthorized communication devices 7 is attempting to access the automobile 1, and the door/trunk controlling module 302 locks the door of the automobile 1, and activates the alarm module 305. The alarm may include sound and lights. The process in FIG. 4 ends with block S155.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method of controlling an automobile using an authorized communication device, being performed by execution of computerized code by a processor of a computing device of the automobile, and comprising:

configuring identification information of the authorized communication device, and storing the identification information in an electronic tag of the authorized communication device and a memory of the computing device;

obtaining identification information from an electronic tag of a communication device upon condition that the electronic tag of the communication device has established a first communication link with a first electronic reader of the automobile, wherein the first electronic reader is placed in a door of the automobile;

determining that the communication device is authorized upon condition that the obtained identification information matches the identification information stored in the memory, and unlocking the door of the automobile;

obtaining identification information from the electronic tag of the communication device which has established a second communication link with a third electronic reader of a radio frequency identification (RFID) module of the automobile;

determining that the communication device is authorized upon condition that the obtained identification information matches the identification information stored in the memory, and starting an engine of the automobile; and in response to determining that an unauthorized communication device is attempting to access the automobile upon condition that the obtained identification information is not matching the identification information stored in the memory, locking the door of the automobile, and generating an alarm.

2. The method according to claim 1, wherein the identification information comprises a user name, a user identity, and/or a serial number of the authorized communication device.

3. The method according to claim 1, further comprising:
unlocking a trunk of the automobile upon condition the electronic tag of the communication device has established a first communication link with a second electronic reader of the automobile, wherein the second electronic reader is placed in the trunk of the automobile.

4. The method according to claim 1, further comprising:
obtaining condition information of the automobile, and storing the condition information in an electronic tag of the RFID module of the automobile, enabling an electronic reader of the communication device to obtain the condition information from the electronic tag of the RFID module of the automobile, wherein the condition information comprises tire pressure, mileage, oil quantity, and temperature reading of the automobile.

5. A computing device, comprising:
a non-transitory storage medium;
at least one processing unit; and
one or more modules that are stored in the non-transitory storage medium, and are executed by the at least one processing unit, the one or more modules comprising instructions to:
configure identification information of the authorized communication device, and store the identification information in an electronic tag of the authorized communication device and the non-transitory storage medium of the computing device;
obtain identification information from an electronic tag of a communication device upon condition that the electronic tag of the communication device has established a first communication link with a first electronic reader of the automobile, wherein the first electronic reader is placed in a door of the automobile;
determine that the communication device is authorized upon condition that the obtained identification information matches the identification information stored in the memory, and unlock the door of the automobile;
obtain identification information from the electronic tag of the communication device which has established a second communication link with a third electronic reader of a radio frequency identification (RFID) module of the automobile;
determine that the communication device is authorized upon condition that the obtained identification information matches the identification information stored in the memory, and start an engine of the automobile; and
in response to determining that an unauthorized communication device is attempting to access the automobile upon condition that the obtained identification information is not matching the identification information stored in the memory, to lock the door of the automobile, and generate an alarm.

6. The computing device according to claim 5, wherein the identification information comprises a user name, a user identity, and/or a serial number of the authorized communication device.

7. The computing device according to claim 5, wherein the one or more modules comprise instructions to:
unlock a trunk of the automobile upon condition the electronic tag of the communication device has established a first communication link with a second electronic reader of the automobile, wherein the second electronic reader is placed in the trunk of the automobile.

8. The computing device according to claim 5, wherein the one or more modules comprise instructions to:
obtain condition information of the automobile, and storing the condition information in an electronic tag of the RFID module of the automobile, enable an electronic reader of the communication device to obtain the condition information from the electronic tag of the RFID module in the automobile, wherein the condition information comprises tire pressure, mileage, oil quantity, and temperature reading of the automobile.

9. A non-transitory storage medium having stored thereon instructions that, when executed by a processor of an electronic device, causes the processor to perform an automobile controlling method, wherein the method comprises:
configuring identification information of the authorized communication device, and storing the identification information in an electronic tag of the authorized communication device and a memory of the computing device;
obtaining identification information from an electronic tag of a communication device upon condition that the electronic tag of the communication device has established a first communication link with a first electronic reader of the automobile, wherein the first electronic reader is placed in a door of the automobile;
determining that the communication device is authorized upon condition that the obtained identification information matches the identification information stored in the memory, and unlocking the door of the automobile;
obtaining identification information from the electronic tag of the communication device which has established a second communication link with a third electronic reader of a radio frequency identification (RFID) module of the automobile;
determining that the communication device is authorized upon condition that the obtained identification information matches the identification information stored in the memory, and starting an engine of the automobile;
in response to determining that an unauthorized communication device is attempting to access the automobile upon condition that the obtained identification information is not matching the identification information stored in the memory, locking the door of the automobile, and generating an alarm.

10. The non-transitory storage medium according to claim 9, wherein the identification information comprises a user name, a user identity, and/or a serial number of the authorized communication device.

11. The non-transitory storage medium according to claim 9, wherein the method further comprises:
unlocking a trunk of the automobile upon condition the electronic tag of the communication device has established a first communication link with a second electronic reader of the automobile, wherein the second electronic reader is placed in the trunk of the automobile.

12. The non-transitory storage medium according to claim 9, wherein the method further comprises:
obtaining condition information of the automobile, and storing the condition information in an electronic tag of the RFID module of the automobile, enabling an electronic reader of the communication device to obtain the condition information from the electronic tag of the RFID module of the automobile, wherein the condition information comprises tire pressure, mileage, oil quantity, and temperature reading of the automobile.

* * * * *